United States Patent [19]

Hoehn et al.

[11] Patent Number: 4,633,784

[45] Date of Patent: Jan. 6, 1987

[54] CLAMPING DEVICE FOR HIGH SPEED INDEXING

[75] Inventors: Robert A. Hoehn, Monticello Township, Johnson County; Thomas B. Doyle, Overland Park, both of Kans.

[73] Assignee: Lico, Inc., Kansas City, Mich.

[21] Appl. No.: 652,337

[22] Filed: Sep. 19, 1984

[51] Int. Cl.$^4$ ............................................ B61B 13/00
[52] U.S. Cl. ...................................... 104/162; 104/167; 198/465.1
[58] Field of Search ................. 104/162, 165, 176, 48, 104/1 R, 167, 166, 172 B, 172 S; 198/792, 472, 334, 465.1

[56] References Cited

U.S. PATENT DOCUMENTS

| | | | |
|---|---|---|---|
| 2,721,521 | 10/1955 | Mitchell | 104/48 |
| 3,260,220 | 7/1966 | Ludwig | 104/162 |
| 3,267,875 | 8/1966 | Chabassier et al. | 104/167 |
| 3,871,303 | 3/1975 | Woodling | 198/334 |
| 4,542,698 | 9/1985 | Wakabayashi | 104/172 B |
| 4,574,706 | 3/1986 | Dehne | 104/162 |

FOREIGN PATENT DOCUMENTS

| | | | |
|---|---|---|---|
| 0048274 | 3/1984 | Japan | 198/465.1 |
| 466339 | 4/1975 | U.S.S.R. | 104/162 |

Primary Examiner—David A. Scherbel
Assistant Examiner—Donald T. Hajec
Attorney, Agent, or Firm—D. A. N. Chase; Michael Yakimo, Jr.

[57] ABSTRACT

A positive-acting coupling device for rigidly coupling a product-carrying dolly to the shuttle carriage of a high speed indexing conveyor is disclosed. Intercoupling of the carriage and the dolly is effected by a pair of clamp arms carried by the carriage which close against the opposed contact surfaces of a striker bar that projects from beneath the dolly. A cam mechanism on the carriage is operated by remotely mounted pneumatic cylinders located at positions along the conveyor where it is desired to either open or close the clamp arms. The cam mechanism is self-locking in the closed position of the clamp so that only a momentary actuating force applied by a cylinder is required. Since the clamp arms are closed against the opposed contact surfaces of the striker bar, no relative movement of the product-carrying dolly and the shuttle carriage is permitted.

7 Claims, 6 Drawing Figures

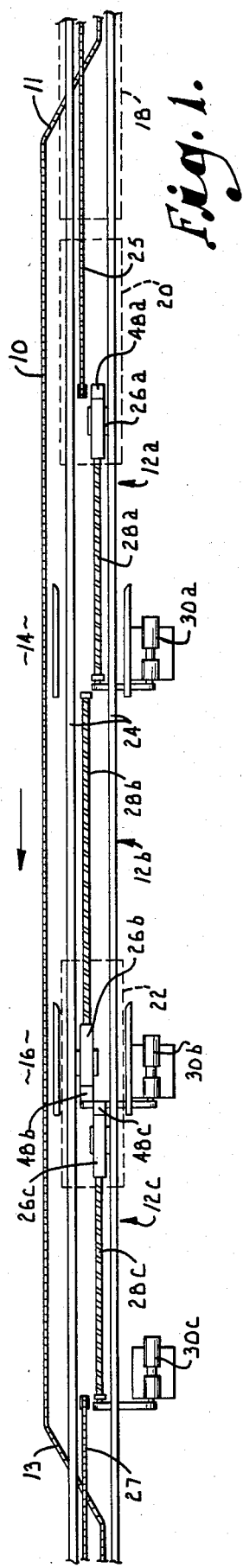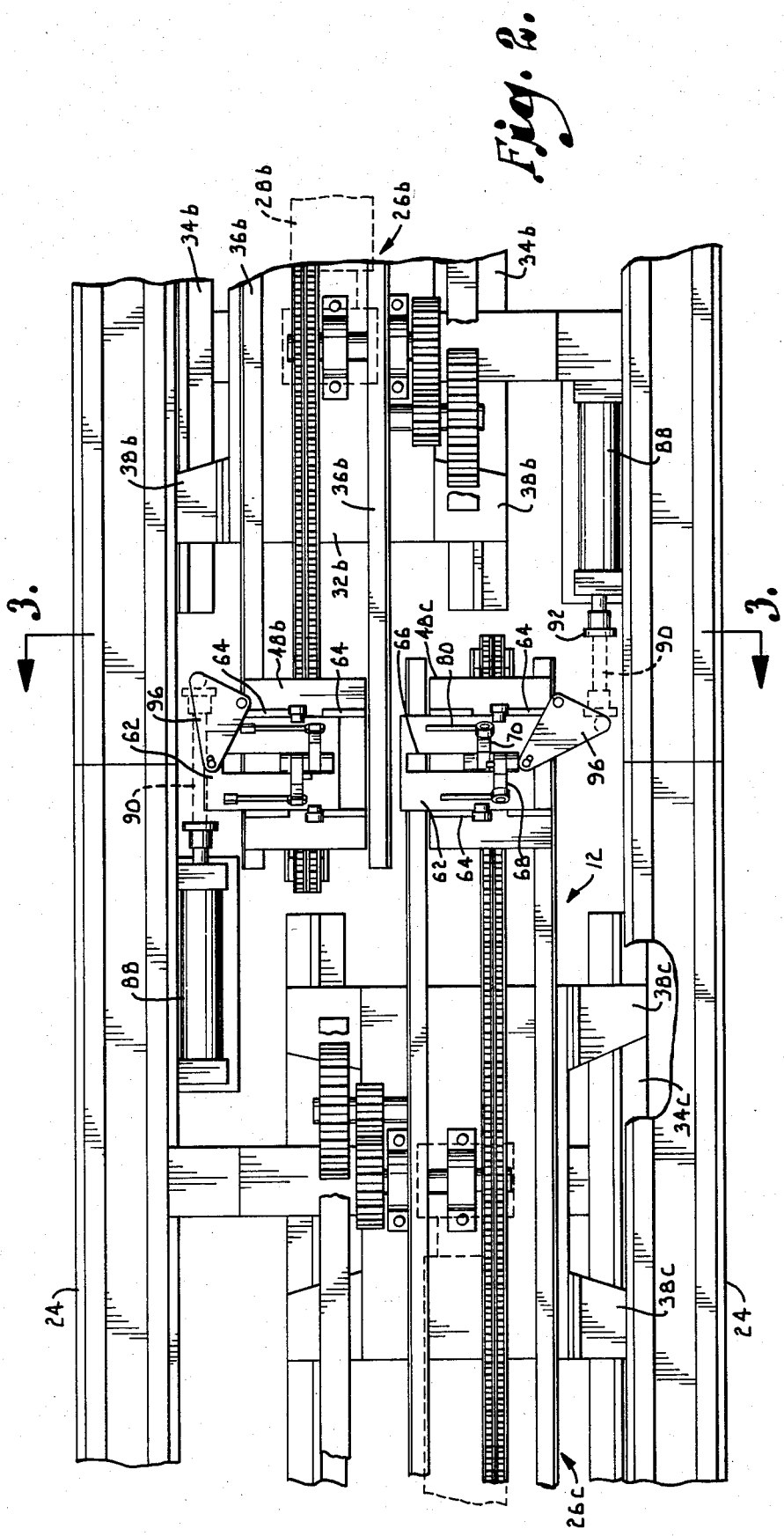

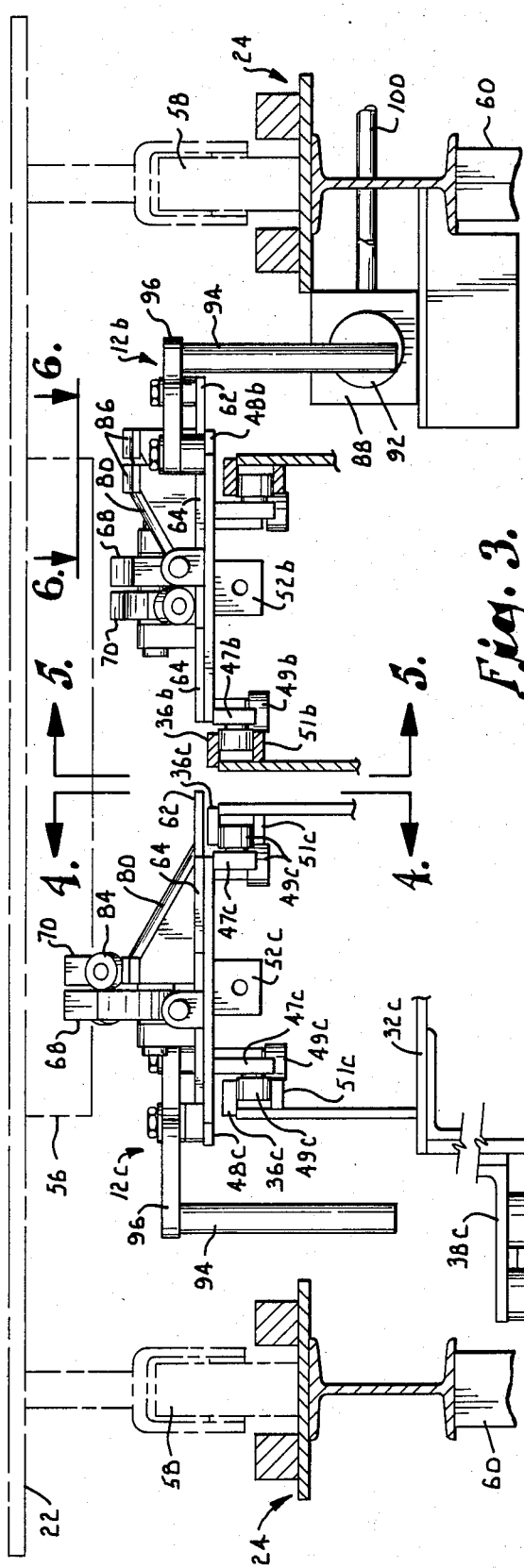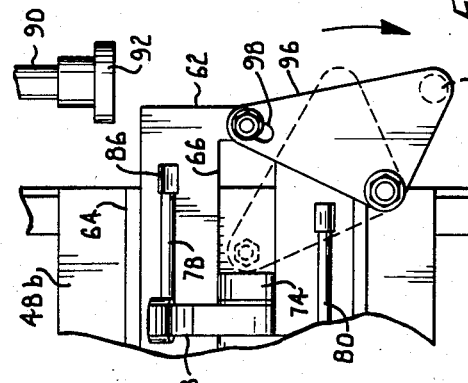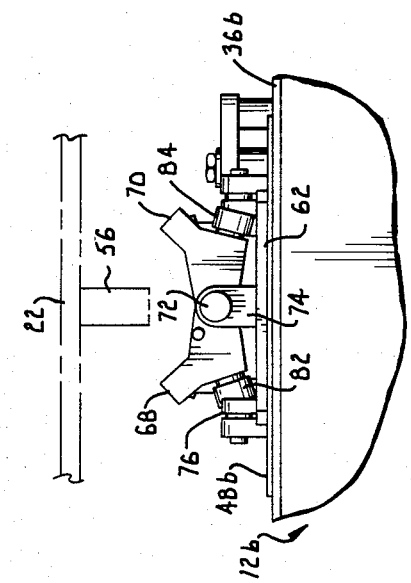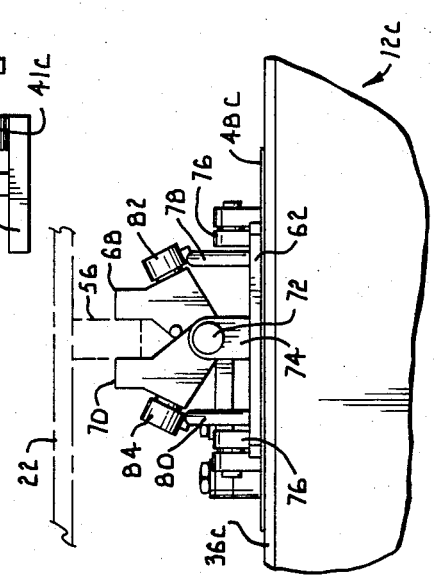

CLAMPING DEVICE FOR HIGH SPEED INDEXING

RELATED APPLICATION

U.S. patent application of Robert A. Hoehn, "INDEXING CONVEYOR FOR ROBOTIC PRODUCTION OPERATIONS," Ser. No. 393,428, filed June 29, 1982.

This invention relates to an improved means of coupling a product-carrying dolly to the shuttle carriage of a high speed indexing conveyor and, in particular, to a positive coupling device that eliminates movement of the dolly relative to the carriage and facilitates accurate positioning of the dolly, and hence the product thereon, at an operating station on a production line.

The above-referenced U.S. patent application of Robert A. Hoehn discloses an indexing conveyor that is especially suited for robotic production operations which are to be integrated with manual production operations. Typically, the conveyor would comprise a plurality of indexing units or sections arranged in tandem and each independently driven and controlled. Indexing is accomplished in each unit by a movable shuttle carriage which is propelled along the axis of a main drive shaft through the engagement of a follower, located beneath the shuttle carriage, with a helical recess in the circumference of the shaft. Controlled acceleration, deceleration and positioning are accomplished by varying the rotational speed of a uniform helical drive shaft or by the use of a variable helical drive shaft rotated at constant speed. The shuttle carriage picks up a product carrier (dolly) by engagement of a drive dog with the carrier to propel the carrier and carriage in unison to a operating station along tracks in parallelism with the axis of the shaft.

A holdback dog is employed in conjunction with the drive dog and is positioned in opposition to the drive dog to limit forward movement of the striker bar of the carrier against which the drive dog is engaged. This requires that some clearance be allowed between the contact surfaces of the two dogs and the striker bar to allow the dogs, which are pivotally mounted, to be disengaged once the shuttle carriage has been advanced to an appropriate position. This clearance can create problems in high speed indexing due to the tendency of the carrier to lurch or hammer against the pushing drive dog and/or the holdback dog surfaces during periods of rapid acceleration and deceleration. Another disadvantage of the intercoupling of the carriage and carrier by pivotal dogs is that the carrier may only be positioned by the indexing unit to an accuracy equal to the maximum clearance between the contact faces of the drive and holdback dogs and the opposing contact surfaces of the striker bar.

Although the problems briefly discussed above could be overcome by mounting hydraulic, air or electrically operated clamping devices directly to the shuttle carriage to rigidly couple the carrier to the carriage, this is not deemed desirable since hydraulic, compressed air, or electric lines would have to be connected to the high speed moving carriages of the indexing conveyor. Accordingly, this approach would be unacceptable from both the standpoints of cost and undue mechanical complexity.

It is, therefore, the primary object of the present invention to provide a positive, yet relatively economical and uncomplex means of rigidly coupling a product carrier to the shuttle carriage of a high speed indexing conveyor.

As a corollary to the foregoing object, it is an important aim of this invention to provide such a coupling means which prevents the carrier from lurching and hammering during rapid acceleration and deceleration, and which provides for maximum accuracy in the positioning of a carrier, and hence the product thereon, at an operating station.

A specific and important object of the invention is to provide coupling means as aforesaid which employs a clamp mounted on the shuttle carriage that closes against the striker bar of the carrier in response to engagement of the clamp arms by a cam mechanism on the carriage operated by remotely mounted actuators independent of the moving carriage which cause closing or opening movement of the clamp arms as required.

Other objects and advantages will become apparent as the detailed description proceeds.

DESCRIPTION OF THE DRAWINGS

FIG. 1 is a diagrammatic, plan view of the indexing conveyor embodying the improvements of the present invention, and showing three indexing sections in tandem and the laterally offset relationship of the helical drive shafts of the respective sections.

FIG. 2 is an enlarged, fragmentary, plan view as in FIG. 1 showing the condition of the clamps on the shuttle carriages of two adjacent indexing sections at the time that a carrier (removed for clarity) is transferred from one section to the next. The broken lines show the piston rods of the pneumatic cylinders as extended during actuation. The upper clamp in FIG. 2 has been released, and the lower clamp has been actuated to engage the striker bar (not shown) of the carrier.

FIG. 3 is a further enlarged, fragmentary, vertical cross section taken along line 3—3 of FIG. 2 with the carrier or dolly and its striker bar added in phantom lines.

FIG. 4 is a vertical cross section taken along line 4—4 of FIG. 3 showing the clamp of the next indexing section closed against the striker bar.

FIG. 5 is a vertical cross section taken along line 5—5 of FIG. 3 showing the clamp of the preceding indexing section open to release the carrier.

FIG. 6 is a detail view in plan illustrating the motion of the crank associated with one of the clamps, the crank being actuated in response to operation of the associated air cylinder.

DETAILED DESCRIPTION

A portion of a production line is diagrammatically illustrated in FIG. 1 where a moving chain conveyor 10 is seen bypassing an indexing conveyor comprising three independent, tandem indexing units or sections 12a, 12b and 12c. The moving chain conveyor 10 is advancing to the left as viewed in FIG. 1 as illustrated by the arrow; likewise, the indexing sections 12a, 12b and 12c advance product-carrying dollies to the left to successive operating stations 14 and 16. In the production line illustrated herein and as set forth in the aforesaid Hoehn application Ser. No. 393,428, the operating stations 14 and 16 employ robots (not shown) which perform a robotic production operation on the products borne by the dollies as they are indexed to the appropriate positions at the respective stations. Such dollies or product carriers are illustrated in FIG. 1 in phantom lines and, from right to left, are designated 18, 20 and 22.

The dollies roll leftwardly on a floor track 24 having elevated rails (see FIG. 3) over the portion of the system spanned by the indexing conveyor. In order to disengage the dollies from the moving chain conveyor 10 and transfer control of the movement and positioning thereof to the indexing conveyor, the moving chain conveyor 10 is "wiped out" in a conventional manner by an offset 11 in the chain track which detours the chain so that it bypasses the indexing conveyor on the right side thereof as viewed in FIG. 1 looking in the direction of advancement of the conveyor system. An accumulating conveyor 25 leads from the offset 11 to the first indexing section 12a. Similarly, the chain conveyor 10 is "wiped in" at the left end of the illustration of FIG. 1 by an offset 13 which returns the moving conveyor 10 to an operative position between the rails of the floor track 24 for reengagement with dollies received from a delivery conveyor 27 leading from the final indexing section 12c. As illustrated in the aforesaid Hoehn application, the floor track 24 is elevated in the illustrated portion of the conveyor system containing the indexing conveyor in order to accommodate the components thereof as will be briefly described.

Each of the indexing units or sections 12a, 12b and 12c is of identical construction; particular reference is made to section 12c as its components are also revealed in FIGS. 2–4. Like components of the other sections 12a and 12b are designated by the same reference numerals but with the "a" or "b" suffix.

The indexing section 12c employs a shuttle carriage 26c that is propelled by a helical drive shaft 28c driven by a suitable prime mover and drive arrangement illustrated at 30c in FIG. 1. The drive shaft 28c is mounted between and in parallelism with the rails of the track 24, the drive 30c being coupled with the leading end of the shaft 28c as is shown in FIG. 1. The shuttle carriage 26c comprises a central base member 32c of inverted U-shaped configuration that rides upon a guide track 34c having a pair of parallel track segments located on opposite sides of the shuttle carriage parallel to the drive shaft 28c. Both of such segments of the guide track 34b and 34c may be seen in FIG. 2.

Base member 32c carries a pair of parallel rails 36c (FIG. 2) spaced above the base member 32c (FIG. 3). The rails 36c are parallel to the drive shaft 28c and extend fore and aft from the central base member 32c for a purpose that will be subsequently discussed. Front and rear feet 38c extend laterally outwardly from base member 32c at its bottom side margins and carry rollers that engage the guide track 34c. Two such rollers 40c rotatable on vertical axes and one such roller 41c on a horizontal axis are shown in FIG. 3 engaging the guide track 34c.

Follower rolls are mounted beneath the base member 32c of the shuttle carriage and hence are hidden from view in FIG. 2. These rolls ride within the uniform helical groove of the drive shaft 28c (shown in phantom lines in FIG. 2) as illustrated and described in the aforesaid Hoehn patent application. A stationary, inverted rack 42c is parallel to and substantially coextensive with the drive shaft 28c, a pinion 46c carried by the shuttle carriage 26c being in mesh with the rack 42c throughout the travel of the shuttle carriage along the helical drive shaft to cause a table 48c on the carriage to travel the length of the rails 36c with each traverse of the shuttle carriage. The table 48c is carried by the rails 36c as seen in FIG. 3 where legs 47c of table 48c are shown provided with vertically and horizontally oriented rollers 49c that ride on longitudinally extending, horizontal members 51c spaced beneath respective rails 36c. A horizontal track for table 48c and lateral stabilization are thus provided.

More particularly with respect to the table drive, FIG. 2 reveals the right end of a sprocket and chain assembly 50c disposed between the rails 36c and coextensive therewith, such chain underlying the table 48c and being connected to a lug 52c (see FIG. 3) depending from the table 48c. Pinion 46c through reduction gearing 54c mounted on base member 32c is connected via a shaft 53c to one of the sprockets 55c (FIG. 2) of the assembly 50c, the selection of gear ratios being such as to cause the table 48c to shift from the position thereof seen in FIG. 2 to a position at the extreme left end of the rails 36c when the shuttle carriage 26c is advanced leftwardly to the leading end of the drive shaft 28c. It should be understood that in FIG. 2 the shuttle carriages 26b and 26c of the indexing sections 12b and 12c are at the extreme left and right ends respectively of their drive shafts. As will be appreciated, the two shuttle carriages shown in FIG. 2 (tables 48b and 48c side-by-side) are in a condition for transfer of a product-carrying dolly from section 12b to section 12c.

The clamping device of the present invention is mounted on the moving table of the shuttle carriage of each of the indexing sections to positively couple the carrier or dolly thereto. Referring to FIGS. 3–5, portions of the dolly 22 are illustrated in phantom lines. It may be seen that the dolly 22 is provided with a striker bar 56 projecting downwardly therefrom and extending laterally at right angles to the path of travel of the dolly 22 along the track 24. The dolly 22 is provided with casters 58 which roll within the track 24, the latter being supported above floor level by spaced columns 60.

A comparison of FIGS. 2 and 3 also reveals the laterally offset relationship of the carriages 12b and 12c, caused by the particular offset positioning of the drive shafts 28b and 28c seen in FIG. 1. It may be appreciated that the axes of the drive shafts 28b and 28c are in parallelism but are laterally offset a sufficient distance to cause the carriages 26b and 26c to assume the side-by-side relationship illustrated when carriage 26b is in its advanced position (leftmost position) and carriage 26c is in its initial or home position (rightmost position). This same offset relationship exists with respect to drive shafts 28a and 28b so that at the adjacent ends of sections 12a and 12b, where transfer of a dolly from section 12a to 12b occurs, this same side-by-side relationship of the two carriages would exist.

Each of the clamping devices and associated operating mechanisms are identical. A rectangular plate 62 is slidably mounted on the table 48a, 48b or 48c and is confined between longitudinal edge guides 64 for movement laterally at right angles to the path of travel of the associated table and its supporting shuttle carriage. A central, longitudinal slot 66 in the plate 62 provides clearance for a pair of clamp arms 68 and 70 mounted on a common pivot 72 carried by posts 74 on the table 48a, b or c. The posts 74 extend through the clearance slot 66 and thus do not interfere with sliding movements of the plate 62 on the underlying table. The plate 62 is held against vertical displacement by a pair of rollers 76 that engage the upper surface of the plate 62 at its opposed longitudinal margins.

The clamp arms 68 and 70 are shown open in FIG. 5 and closed in FIG. 4 against the depending striker bar 56. In each clamp the arm 68 will be referred to herein as the front clamp arm and the arm 70 will be referred to as the rear clamp arm due to their orientation with respect to the direction of movement of the associated shuttle carriage, i.e., movement from the home position to the advanced position being in a forward sense and return movement to the home position being considered as rearward. Likewise, the striker bar 56 presents a pair of opposed contact surfaces facing forwardly and rearwardly with respect to such path of travel, these surfaces being engaged when the clamp arms are closed thereagainst as illustrated in FIG. 4. In FIG. 5 it may be appreciated that the clamp arms 68 and 70 clear the striker bar 56 therebeneath when the clamp is open.

Opening and closing of the clamp arms or jaw is accomplished by a pair of camming ramps 78 and 80 rigid with the slidable plate 62 and which project upwardly therefrom adjacent respective longitudinal margins of the plate 62 in alignment with follower rollers 82 and 84 carried by respective clamp arms 68 and 70. Each of the camming ramps 78 and 80 is provided with a flat 86 at the top of its inclined surface as best seen in FIG. 3. The purpose of the flats 86 is to render the mechanism self-locking when the clamp arms 68 and 70 are closed against the striker bar 56, thereby holding the clamp arm closed without requiring that the plate 62 be held or locked in that position.

The plate 62 of each of the clamps in the indexing conveyor is shifted by the action of appropriately located pneumatic piston and cylinder assemblies, two of which are seen at 88 in FIG. 2. The air cylinder 88 in the upper portion of the illustration of FIG. 2 is secured to the support structure for the adjacent rail of track 24 and has a piston rod 90 shown extended in broken lines. Likewise, the piston rod 90 of the lower air cylinder 88 in FIG. 2 is shown in its extended position in broken lines.

The shifting of the associated slide plate 62 by each of these air cylinder actuators is best illustrated in FIGS. 3 and 6. The air cylinder 88 in the upper portion of FIG. 2 is revealed in FIG. 3 in an end view looking forwardly with respect to the direction of movement of the indexing conveyor. The associated piston rod 90 terminates in an end piece 92, and it may be seen that the axis of the rod is in direct alignment with a vertical bar 94 which is a component of a crank assembly that is pivotally secured to both the table 48b and the plate 62 thereon. Such assembly further includes a triangular crank element 96 from which the bar 94 depends at one apex thereof. The other apexes are pivotally secured to the table 48b and the plate 62 respectively, the element 96 being slotted at 98 at its pivotal connection to the plate 62 to permit rotational movement of the element 96 to impart rectilinear movement to the plate 62 as illustrated by a comparison of the full and broken line illustrations in FIG. 6. Air lines to the cylinder 88 in FIG. 3 are shown at 100.

Accordingly, the air cylinders 88 are positioned as appropriate to control the opening and closing of the various clamp arms of the indexing conveyor as desired in a particular application. Typically, two air cylinders 88 would be located as illustrated in FIG. 2 at the advanced position of the shuttle carriage of one indexing section and the initial position of the carriage of the next indexing section so as to effect the release of a carrier transported to an operating station and subsequent reengagement of that carrier with the next indexing section for movement to either a subsequent operating station or to a location for reengagement with the moving chain conveyor 10. It should be noted that the utilization of the moving tables 48a, 48b and 48c of the respective indexing sections 12a, 12b and 12c increases the reach of each shuttle carriage beyond the ends of its drive shaft and thus increases the effective length of travel of the clamp 68, 70 as the carriage moves between its initial and advanced positions. The rear end of the drive shaft 28c is shown in phantom lines in FIG. 2 supported in a journal box 29c, illustrating that the table 48c extends a sufficient distance therebeyond to permit lateral alignment with table 48b as shown. This permits the clamps 68, 70 of both tables 48b and 48c to be simultaneously positioned directly beneath the striker bar of a dolly such as illustrated in FIGS. 3-5 with respect to the striker bar 56.

The clamp 68, 70 on table 48b is shown in FIG. 2 in its released condition, this having been effected by momentary extension of the piston rod 90 of the associated air cylinder 88 which caused the plate 62 to shift to the right as viewed looking in the direction of movement (to the left) of the conveyor. As may be seen in FIG. 5, such movement withdraws the cams from beneath the follower rollers 82 and 84 to permit the clamp arms 68 and 70 to swing open by gravity. The shuttle carriage 26b may then be returned to its home postion.

Either before or after carriage 26b commences return movement, having delivered the dolly to the desired location, the table 48c of indexing section 12c is shifted to the position illustrated in FIG. 2 to couple the dolly with shuttle carriage 26c during or at the close of the production operation. At the desired time, the associated air cylinder 88 is momentarily operated to extend its piston rod 90 and shift plate 66 to the right (viewed in the direction of movement of the conveyor) to the disposition thereof seen in FIG. 2. This forces the camming ramps 78 and 80 into engagement with corresponding follower rollers 82 and 84 to swing the clamp arms 68 and 70 to the closed position illustrated in FIG. 4. At this time the flats 86 are under the rollers 82 and 84 to lock the clamp closed without further application of actuating force; therefore, the extension of the piston rod 90 is only momentary. It should be appreciated from FIG. 4 that the front and rear clamp arms 68 and 70 are held in surface-to-surface contact with the opposed contact surfaces of the striker bar 58 and that, therefore, a rigid coupling is formed by the jaw action of the clamp arms against the opposed surfaces of the striker bar. This permits positive positioning of dollies by the indexing conveyor sections and, due to the absence of any clearance between the opposed contact surfaces of the striker bar and the contact faces of the clamp arms, no relative movement between the intercoupled dolly and carriage is permitted.

Having thus described the invention, what is claimed as new and desired to be secured by Letters Patent is:

1. In an indexing conveyor:
   a shuttle carriage;
   drive means connected with said shuttle carriage for advancing the same along a predetermined path of travel from a first position to a second position, and for returning said carriage to said first position;
   a product carrier movable along said path and having a projecting coupling member presenting a pair of opposed contact surfaces facing generally forwardly and rearwardly with respect to said path of travel;

clamping means mounted on said carriage and having a pair of front and rear clamp arms engageable with corresponding contact surfaces of said coupling member;

an operating mechanism on said carriage associated with said clamping means, said mechanism having operating means shiftable in one direction into engagement with said clamp arms to close the same against said contact surfaces of the coupling member and hold the clamp arms closed thereagainst to couple said carriage and carrier together for movement of the carrier by the carriage in unison along said path, and shiftable in another direction to open said clamp arms and release the carrier; and power operated means independent of said carriage and disposed adjacent said first and second positions thereof for actuating said operating mechanism to close and open said clamp arms when the carriage is at said first and second positions respectively, said power operated means including a first actuator operable to engage said operating mechanism when the carriage is in said first position thereof to shift said operating means in said one direction to close the clamp arms, and a second actuator operable to engage said mechanism when the carriage is in said second position thereof for shifting the operating means in said another direction to disengage the operating means from the clamp arms to open the latter, whereby to couple the carrier with the carriage at said first position and release the carrier at said second position.

2. The apparatus as claimed in claim 1, wherein said operating means includes cam means shiftable in said directions and engageable with said clamp arms.

3. In an indexing conveyor:

first and second indexing units in tandem, each having a shuttle carriage and drive means connected with said shuttle carriage for advancing the same from an initial position to an advanced position and for returning said carriage to said initial position, the advanced position of the carriage of said first indexing unit and the initial position of the carriage of said second indexing unit being adjacent each other to define a transfer zone, a product carrier movable along a path of travel extending from said initial position of the carriage of said first indexing unit through said transfer zone to the advanced position of the carriage of second indexing unit, said carrier having coupling structure projecting therefrom, each of said carriages being provided with clamping means thereon having a pair of clamp arms engageable with said coupling structure, and an operating mechanism associated with said clamping means and having means shiftable in one direction to close said clamp arms into engagement with said structure to couple said carriage and carrier together for movement of the carrier by the carriage in unison along said path, and shiftable in another direction to open said clamp arms and release the carrier, the clamping means of the two carriages being laterally offset with respect to said path of travel to dispose the pairs of clamp arms substantially side-by-side in said transfer zone, and power operated means independent of said carriages and disposed adjacent said transfer zone for actuating the operating mechanism of the carriage of said first indexing unit to open the clamp arms thereof when such carriage is at its advanced position in said transfer zone, and for actuating the operating mechanism of the carriage of said second indexing unit to close its clamp arms when such carriage is at its initial position in said transfer zone, whereby to release the carrier from the first unit and couple it to the second unit for movement by the carriage thereof away from said transfer zone.

4. The apparatus as claimed in claim 3, wherein the drive means of each indexing unit includes a helical drive shaft extending generally along said path and follower means on the carriage operably engaged with said shaft, and wherein the axes of the drive shafts of said first and second indexing units are in parallelism and laterally offset to dispose the carriages of said units in substantially side-by-side relationship when both carriages are in said transfer zone.

5. In an indexing conveyor:

a shuttle carriage;

drive means connected with said shuttle carriage for advancing the same along a predetermined path of travel from a first position to a second position, and for returning said carriage to said first position;

a product carrier movable along said path and having a projecting coupling member;

clamping means mounted on said carriage and having a pair of clamp arms engageable with said coupling member;

an operating mechanism on said carriage associated with said clamping means, said mechanism having operating means shiftable in one direction into engagement with said clamp arms to close the same against said member and hold the clamp arms closed thereagainst to couple said carriage and carrier together for movement of the carrier by the carriage in unison along said path, and shiftable in another direction to open said clamp arms and release the carrier; and means independent of said carriage and disposed adjacent said first and second positions thereof for actuating said operating mechanism to close and open said clamp arms when the carriage is at said first and second positions respectively, including a first actuator operable to engage said operating mechanism when the carriage is in said first position thereof to shift said operating means in said one direction to close the clamp arms, and a second actuator operable to engage said mechanism when the carriage is in said second position thereof for shifting the operating means in said another direction to disengage the operating means from the clamp arms to open the latter, whereby to couple the carrier with the carriage at said first position and release the carrier at said second position.

6. In an indexing conveyor:

a shuttle carriage;

drive means connected with said shuttle carriage for advancing the same along a predetermined path of travel from a first position to a second position, and for returning said carriage to said first position;

a product carrier movable along said path and having a projecting coupling member presenting a pair of opposed contact surfaces facing generally forwardly and rearwardly with respect to said path of travel;

clamping means mounted on said carriage and having a pair of front and rear clamp arms engageable with corresponding contact surfaces of said coupling member;

an operating mechanism on said carriage associated with said clamping means, said mechanism having means shiftable in one direction to close said clamp arms into engagement with said member to couple said carriage and carrier together for movement of the carrier by the carriage in unison along said path, and shiftable in another direction to open said clamp arms and release the carrier, said shiftable means for closing and opening said clamp arms including plate structure shiftable transversely of said path of travel in said one direction and said another, opposite direction, and a pair of camming ramps on said plate structure movable into engagement with respective clamp arms upon movement of said plate structure in said one direction, said camming ramps having flats at the tops thereof for holding the clamp arms closed, said clamping means including pivot means mounting each of said clamp arms for swinging movement about an axis extending transversely of said path of travel, and follower means carried by said clamp arms and engageable by said camming ramps and flats for causing said clamp arms to close in response to movement of said plate structure in said one direction; and power operated means independent of said carriage and disposed adjacent said first and second positions thereof for actuating said operating mechanism to close and open said clamp arms when the carriage is at said first and second positions respectively, whereby to couple the carrier with the carriage at said first position and release the carrier at said second position.

7. The apparatus as claimed in claim 6, wherein said shuttle carriage has a table portion supporting said plate structure, and wherein said operating mechanism includes an operating component extending clear of said table portion and disposed for engagement by said power operated means, the latter including a first actuator operable to engage said component when the carriage is at said first position thereof to shift said plate structure in said one direction to close the clamp arms, and a second actuator operable to engage said component when the carriage is at said second position thereof to shift said plate structure in the opposite direction to open the clamp arms.

* * * * *